(12) United States Patent
Haraguchi et al.

(10) Patent No.: US 10,107,113 B2
(45) Date of Patent: Oct. 23, 2018

(54) STEAM TURBINE VANE MANUFACTURING METHOD

(71) Applicant: MITSUBISHI HITACHI POWER SYSTEMS, LTD., Kanagawa (JP)

(72) Inventors: Hidetaka Haraguchi, Tokyo (JP); Hiroharu Oyama, Tokyo (JP); Takahiro Ota, Tokyo (JP); Motonari Machida, Tokyo (JP); Kohei Hatano, Tokyo (JP); Takumi Matsumura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 189 days.

(21) Appl. No.: 14/762,341

(22) PCT Filed: Jan. 24, 2014

(86) PCT No.: PCT/JP2014/051519
§ 371 (c)(1),
(2) Date: Jul. 21, 2015

(87) PCT Pub. No.: WO2014/141755
PCT Pub. Date: Sep. 18, 2014

(65) Prior Publication Data
US 2015/0377043 A1    Dec. 31, 2015

(30) Foreign Application Priority Data

Mar. 13, 2013    (JP) .................................. 2013-050087

(51) Int. Cl.
*F01D 5/28* (2006.01)
*F01D 5/14* (2006.01)
(Continued)

(52) U.S. Cl.
CPC ............ *F01D 5/288* (2013.01); *B23K 26/342* (2015.10); *B23K 26/38* (2013.01); *F01D 5/147* (2013.01);
(Continued)

(58) Field of Classification Search
CPC .............. B23K 10/027; B23K 11/0013; B23K 26/342; B23K 26/38; B23K 2201/001;
(Continued)

(56) References Cited

U.S. PATENT DOCUMENTS 5,340,530 A * 8/1994 Coulon ..................... B22F 5/04
419/49
5,351,395 A * 10/1994 Crawmer ................ B23P 6/005
29/889.1
(Continued)

FOREIGN PATENT DOCUMENTS

DE    43 10 896    3/1994
EP    1 717 326    11/2006
(Continued)

OTHER PUBLICATIONS

Second Office Action dated Sep. 12, 2016 in corresponding Chinese patent application No. 2014800006374.2 (with English translation).
(Continued)

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

A steam turbine vane manufacturing method including: a groove processing step for forming a protective part joint surface on a steam turbine vane material that has been subjected to rough processing; a build-up welding step for forming, by build-up welding, a protective part build-up bead on the protective part joint surface; and a processing
(Continued)

step for performing processing, by cutting the first steam turbine vane material that has been subjected to rough processing and the protective part build-up bead, to finish the first steam turbine vane material has been subjected to rough processing so that the first steam turbine vane material becomes a second steam turbine vane material that has been subjected to finishing processing. The first steam turbine vane material that has been subjected to rough processing is larger than the second steam turbine vane material that has been subjected to finishing processing.

5 Claims, 6 Drawing Sheets

(51) Int. Cl.
| | | |
|---|---|---|
| | *B23K 26/342* | (2014.01) |
| | *B23K 26/38* | (2014.01) |
| | *F01D 9/02* | (2006.01) |
| | *B23K 101/00* | (2006.01) |

(52) U.S. Cl.
CPC .............. *F01D 5/286* (2013.01); *F01D 9/02* (2013.01); *B23K 2201/001* (2013.01); *F05D 2220/31* (2013.01); *F05D 2230/10* (2013.01); *F05D 2230/25* (2013.01); *F05D 2230/30* (2013.01); *F05D 2230/31* (2013.01); *F05D 2230/90* (2013.01); *F05D 2240/12* (2013.01); *F05D 2240/303* (2013.01); *F05D 2240/307* (2013.01)

(58) Field of Classification Search
CPC . F01D 5/147; F01D 5/28; F01D 5/286; F01D 5/288; F05D 2230/10; F05D 2230/30; F05D 2230/31–2230/314; F05D 2230/40; F05D 2230/41; B23P 6/007
See application file for complete search history.

(56) References Cited

U.S. PATENT DOCUMENTS

| | | | | | |
|---|---|---|---|---|---|
| 5,448,828 | A | * | 9/1995 | Willems | B22F 7/06 29/889.1 |
| 6,127,044 | A | * | 10/2000 | Yamamoto | B21K 3/04 148/669 |
| 2006/0067830 | A1 | * | 3/2006 | Guo | B23P 6/007 416/229 R |
| 2006/0263231 | A1 | * | 11/2006 | Groh | B22F 3/004 419/6 |
| 2007/0033983 | A1 | * | 2/2007 | Aubry | B21J 13/03 72/446 |
| 2009/0123290 | A1 | | 5/2009 | Imano et al. | |
| 2009/0162207 | A1 | | 6/2009 | Peters et al. | |
| 2010/0270360 | A1 | * | 10/2010 | Wallis | B23K 20/023 228/160 |
| 2013/0298401 | A1 | | 11/2013 | Sato et al. | |
| 2014/0072715 | A1 | * | 3/2014 | Jones | F01D 5/286 427/367 |
| 2015/0233257 | A1 | * | 8/2015 | Fujiya | F01D 5/288 416/224 |
| 2016/0158875 | A1 | * | 6/2016 | Ishihara | B23K 37/06 219/121.14 |

FOREIGN PATENT DOCUMENTS

| | | |
|---|---|---|
| EP | 2 072 177 | 6/2009 |
| JP | 62-63101 | 3/1987 |
| JP | 1-202389 | 8/1989 |
| JP | 2-99283 | 4/1990 |
| JP | 4-63902 | 2/1992 |
| JP | 6-235301 | 8/1994 |
| JP | 7-158402 | 6/1995 |
| JP | 2003-226943 | 8/2003 |
| JP | 2006-16671 | 1/2006 |
| JP | 2006-291344 | 10/2006 |
| JP | 2008-190039 | 8/2008 |
| JP | 2010-84553 | 4/2010 |
| JP | 4901413 | 3/2012 |
| JP | 2012-86241 | 5/2012 |
| WO | 2006/094935 | 9/2006 |
| WO | 2012/043374 | 4/2012 |

OTHER PUBLICATIONS

Extended European Search Report dated Sep. 23, 2016 in corresponding European patent application No. 14764425.6.
International Search Report dated Feb. 18, 2014 in International Application No. PCT/JP2014/051519.
Written Opinion of the International Searching Authority dated Feb. 18, 2014 in International Application No. PCT/JP2014/051519.
Office Action dated Jun. 28, 2016 in Japanese patent application No. 2013-050087 (with English translation).

* cited by examiner

STEAM TURBINE VANE MANUFACTURING METHOD

TECHNICAL FIELD

The present invention relates to a steam turbine vane manufacturing method and in particular, to a steam turbine vane manufacturing method which is utilized when producing a steam turbine vane with which a steam turbine is provided.

BACKGROUND ART

A steam turbine is known which generates power by receiving high-temperature and high-pressure steam in a steam turbine vane. Water droplets contained in the steam come into contact with the steam turbine vane, whereby erosion sometimes occurs (refer to Japanese Unexamined Patent Application Publication No. 2008-190039).

Technical Problem

A measure against erosion is known which prevents erosion of a main body portion of a steam turbine vane by forming a protective part at a portion of the steam turbine vane. It is desirable to appropriately manufacture the steam turbine vane with such a measure against erosion applied thereto.

SUMMARY OF INVENTION

An object of the present invention is to provide a steam turbine vane manufacturing method of appropriately manufacturing a steam turbine vane.

Solution to Problem

According to a first aspect of the present invention, there is provided a steam turbine vane manufacturing method including: a groove processing step of forming a protective part joint surface in a steam turbine vane material; a build-up welding step of forming a protective part build-up bead on the protective part joint surface by build-up welding; and a processing step of processing the steam turbine vane material into a steam turbine vane by cutting the protective part build-up bead along with the steam turbine vane material.

At this time, the steam turbine vane material is larger than a steam turbine vane material after finishing processing in which a steam turbine vane material has been subjected to finishing processing, and thus is not easily deformed by heat input due to build-up welding, as compared to the steam turbine vane material after finishing processing. For this reason, in such a steam turbine vane manufacturing method, as compared to another steam turbine vane manufacturing method in which a protective part build-up bead is formed after a steam turbine vane material is subjected to finishing processing, it is possible to reduce the deformation amount of the steam turbine vane material which is deformed by build-up welding, and thus it is possible to appropriately manufacture a steam turbine vane.

The steam turbine vane manufacturing method according to the first aspect further includes: a forging step of manufacturing the steam turbine vane material by forging.

The steam turbine vane material manufactured by forging is larger than a steam turbine vane material after rough processing formed by performing cutting on a forged part, and thus is not easily deformed by heat input due to build-up welding. For this reason, in such a steam turbine vane manufacturing method, as compared to another steam turbine vane manufacturing method in which a protective part build-up bead is formed on a protective part joint surface which is formed in the steam turbine vane material after rough processing, it is possible to reduce the deformation amount of the steam turbine vane material which is deformed by build-up welding, and thus it is possible to appropriately manufacture a steam turbine vane.

The steam turbine vane manufacturing method according to the first aspect further includes: an aging treatment step of performing aging treatment on the steam turbine vane material along with the protective part build-up bead before the processing step is carried out.

According to such a steam turbine vane manufacturing method, the steam turbine vane material is hardened by being subjected to aging treatment, and thus it is possible to easily perform straightening on the steam turbine vane material before it is cut, and thus it is possible to easily manufacture a steam turbine vane.

According to a second aspect of the present invention, there is provided a steam turbine vane which is manufactured by carrying out the steam turbine vane manufacturing method according to the present invention. In such a steam turbine vane, as compared to another steam turbine vane in which a protective part build-up bead is formed after a steam turbine vane material is subjected to finishing processing, it is possible to reduce the deformation amount of the steam turbine vane material which is deformed by build-up welding, and thus it is possible to appropriately manufacture the steam turbine vane.

Advantageous Effects of Invention

According to the steam turbine vane manufacturing method according to the present invention, by performing finishing processing on the steam turbine vane material after build-up welding, it is possible to reduce the deformation amount of the steam turbine vane material which is deformed by build-up welding, and thus it is possible to appropriately manufacture a steam turbine vane.

DESCRIPTION OF EMBODIMENTS

Figure 1:
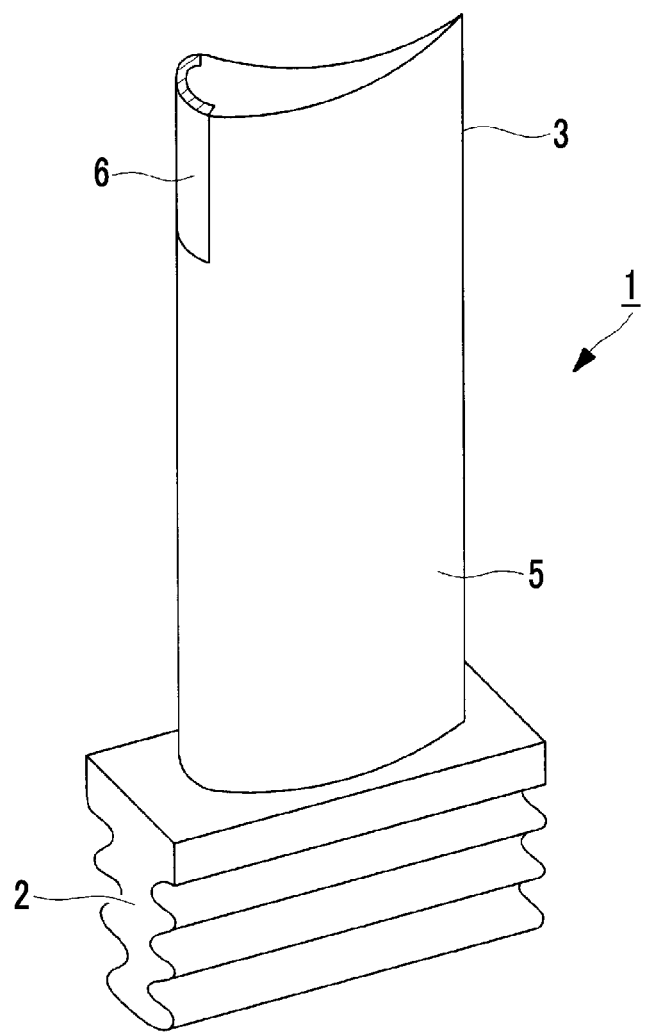
FIG. 1 is a perspective view showing a steam turbine vane.

An embodiment of a steam turbine vane according to the present invention will be described below with reference to the drawings. A steam turbine vane 1 is utilized in a steam turbine and provided with a root section 2 and an aerofoil profile section 3, as shown in FIG. 1. The root section 2 is mounted on a rotor of a steam turbine. The aerofoil profile section 3 is formed in an aerofoil profile and fixed to the root section 2. The aerofoil profile section 3 is exposed to steam flowing through the steam turbine when the root section 2 is mounted on the rotor of the steam turbine.

The aerofoil profile section 3 is provided with a main body portion 5 and a protective part 6. The main body portion 5 is formed in a substantially aerofoil profile and formed integrally with the root section 2, thereby being fixed to the root section 2. The protective part 6 is formed of Stellite (registered trademark). The protective part 6 is joined to the main body portion 5 so as to form a leading edge portion of an airfoil tip of the aerofoil profile section 3.

Figure 2:
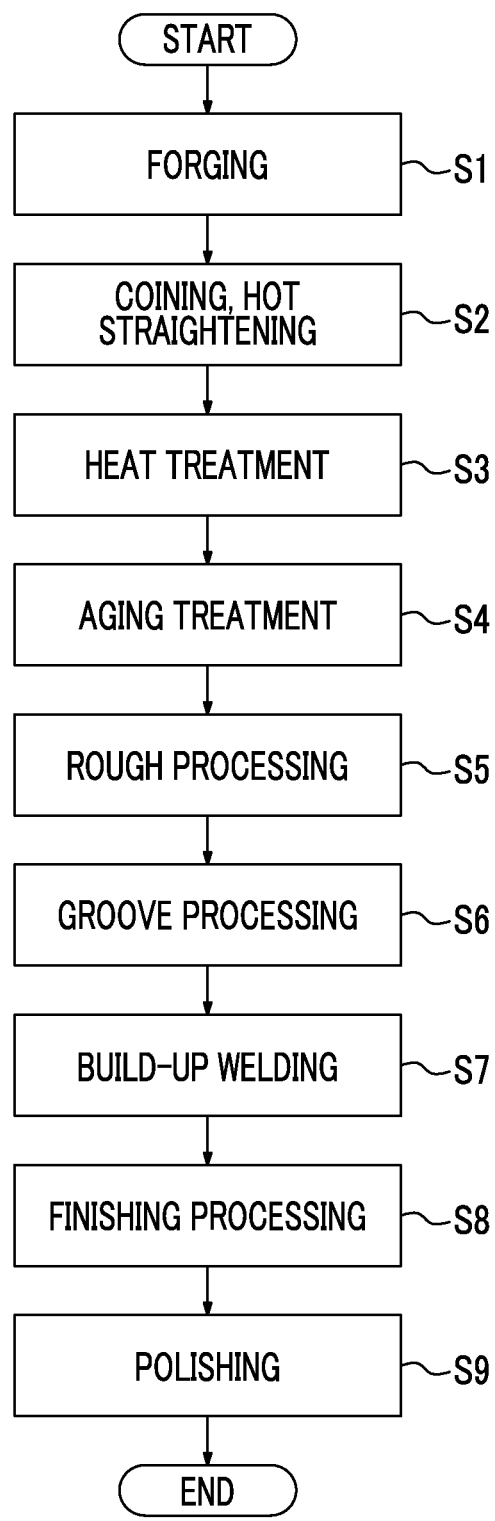
FIG. 2 is a flowchart showing an embodiment of a steam turbine vane manufacturing method.

An embodiment of a steam turbine vane manufacturing method is utilized when manufacturing the steam turbine vane 1. In the steam turbine vane manufacturing method, first, as shown in FIG. 2, a steam turbine vane material after forging is manufactured by forging a solid metal blank (Step S1). The steam turbine vane material after forging is formed in a predetermined shape with high accuracy by being further subjected to coining. After the coining, the steam turbine vane material after forging is formed in a predetermined shape with higher accuracy by being subjected to hot straightening (Step S2).

After the hot straightening, the steam turbine vane material after forging is subjected to solution heat treatment. After the solution heat treatment, the steam turbine vane material after forging is subjected to stabilization heat treatment (Step S3). After the heat treatment, the steam turbine vane material after forging is further subjected to aging treatment, thereby being hardened (Step S4).

Figure 3:
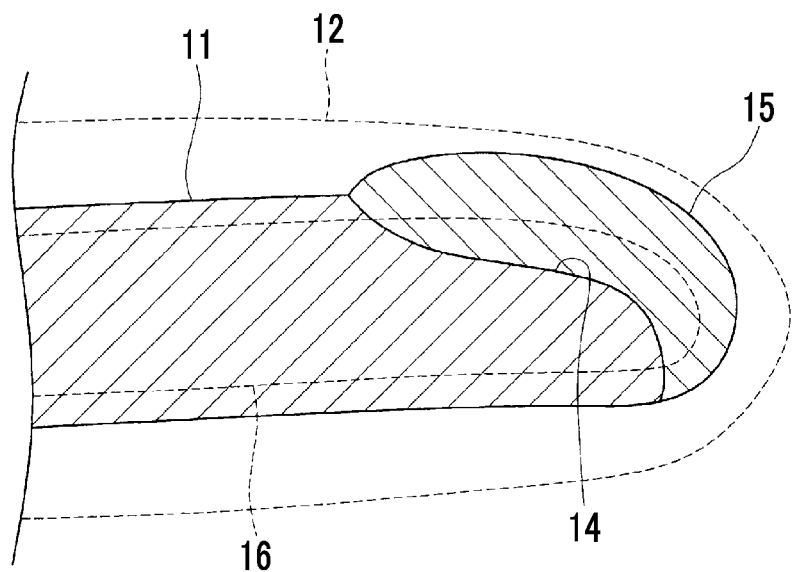
FIG. 3 is a cross-sectional view showing a steam turbine vane material.

After the aging treatment, the steam turbine vane material after forging is subjected to straightening so as to be formed in a predetermined shape. After the straightening, the steam turbine vane material after forging is subjected to cutting, thereby being formed into a steam turbine vane material after rough processing (Step S5). As shown in FIG. 3, most of the surface formed in a steam turbine vane material after forging 12 is removed by cutting, and thus a steam turbine vane material after rough processing 11 is smaller than the steam turbine vane material after forging 12.

The steam turbine vane material after rough processing 11 is further subjected to cutting, whereby a protective part joint surface 14 is formed (Step S6). The protective part joint surface 14 is formed in an area corresponding to a leading edge portion of the steam turbine vane 1, of the steam turbine vane material after rough processing 11, and formed to be concave.

In the steam turbine vane material after rough processing 11, after the protective part joint surface 14 is formed, filler metal which contains Stellite (registered trademark) is buildup-welded to the protective part joint surface 14 by using a laser beam which is emitted from a $CO_2$ laser. In the steam turbine vane material after rough processing 11, a protective part build-up bead 15 is formed by the build-up welding (Step S7). For this reason, the protective part build-up bead is formed of Stellite (registered trademark) and solidly joined to the protective part joint surface 14. The protective part build-up bead 15 is formed in an area corresponding to the leading edge portion of the steam turbine vane 1, of the steam turbine vane material after rough processing 11, and formed as a projection.

After the protective part build-up bead 15 is formed, the steam turbine vane material after rough processing 11 is subjected to straightening so as to be formed in a predetermined shape. After the straightening, the steam turbine vane material after rough processing 11 is subjected to cutting, thereby being formed into a steam turbine vane material after finishing processing 16 (Step S8). The steam turbine vane material after finishing processing 16 is formed such that most of the surface of the steam turbine vane material after rough processing 11 is removed and such that most of the surface of the protective part build-up bead 15 is removed. For this reason, the steam turbine vane material after finishing processing 16 is smaller than the steam turbine vane material after rough processing 11. The steam turbine vane material after finishing processing 16 is subjected to polishing, thereby being formed into the steam turbine vane 1 (Step S9). The steam turbine vane 1 is manufactured in this manner, whereby a portion of the protective part build-up bead 15 is formed into the protective part 6.

In a comparative example of the steam turbine vane manufacturing method, the steam turbine vane 1 is manufactured by joining a Stellite plate to the protective part joint surface 14 of the steam turbine vane material after finishing processing 16 by brazing. In a case of joining the Stellite plate to the protective part joint surface 14 by brazing, it is necessary for the protective part joint surface 14 to be sufficiently heated, and thus it is necessary to heat the surface on the side opposite to the protective part joint surface 14, of a base material. For this reason, the amount of heat which is input to the base material due to the brazing is relatively large.

In this steam turbine vane manufacturing method, the protective part build-up bead 15 is formed by build-up welding, whereby it is not necessary to heat the surface on the side opposite to the protective part joint surface 14, of the steam turbine vane material after rough processing 11. For this reason, in this steam turbine vane manufacturing method, as compared to the steam turbine vane manufacturing method of the comparative example in which the steam turbine vane is manufactured by joining the Stellite plate to the protective part joint surface 14 by brazing, it is possible to reduce the amount of heat which is input to the steam turbine vane material after rough processing 11. As a result, in this steam turbine vane manufacturing method, as compared to the comparative example, it is possible to reduce the deformation amount of the steam turbine vane material after rough processing 11, and thus it is possible to more appropriately manufacture the steam turbine vane 1.

The deformation amount of a relatively large base material which is deformed by build-up welding is smaller than the deformation amount of a relatively small base material which is deformed by build-up welding. For this reason, in this steam turbine vane manufacturing method, the protective part build-up bead 15 is formed on the protective part joint surface 14 of the steam turbine vane material after rough processing 11, whereby the deformation amount of the base material can be reduced, as compared to a case of forming the protective part build-up bead 15 on the protective part joint surface 14 of the steam turbine vane material after finishing processing 16. As a result, in this steam turbine vane manufacturing method, it is possible to more appropriately manufacture the steam turbine vane 1, as compared to another steam turbine vane manufacturing method in which build-up welding is performed on the steam turbine vane material after finishing processing 16.

Figure 4:
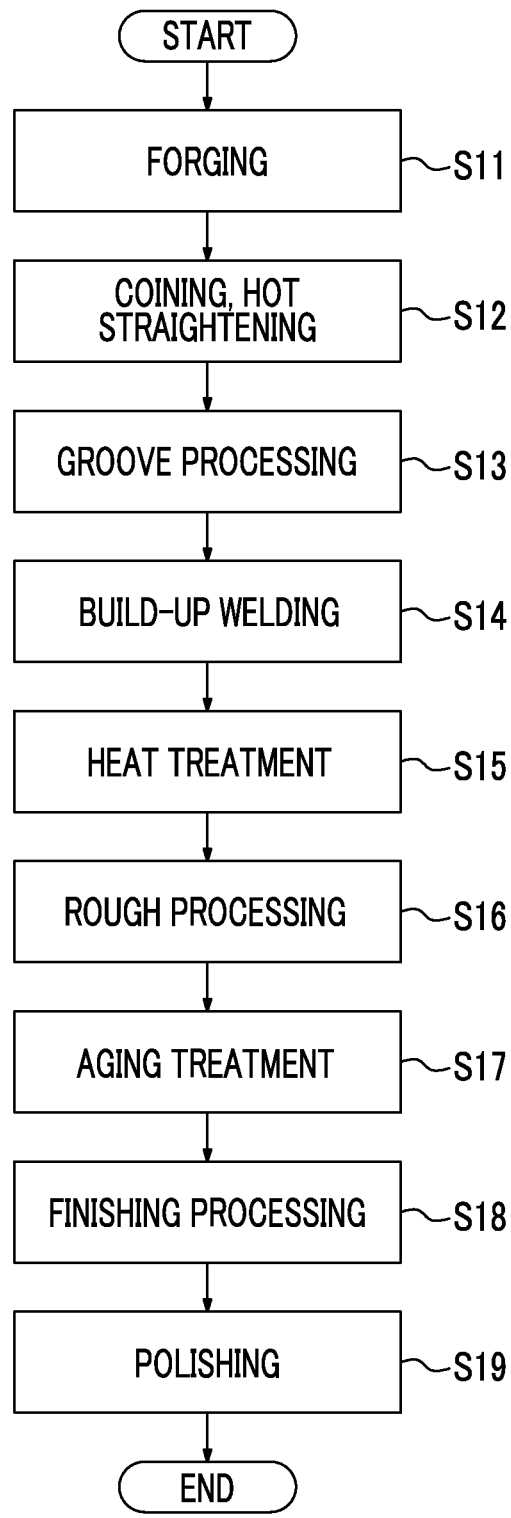
FIG. 4 is a flowchart showing another embodiment of the steam turbine vane manufacturing method.

FIG. 4 shows another embodiment of the steam turbine vane manufacturing method according to the present invention. In the steam turbine vane manufacturing method, first, in the same manner as in the steam turbine vane manufacturing method shown in FIG. 2, a steam turbine vane material after forging is manufactured by forging a solid metal blank (Step S11) and then subjected to coining and hot straightening (Step S12).

Figure 5:
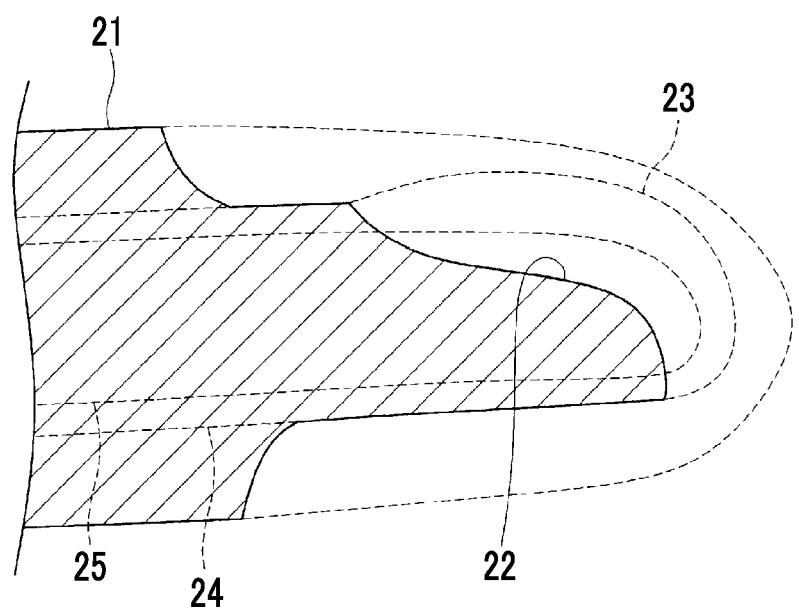
FIG. 5 is a cross-sectional view showing another steam turbine vane material.

After the hot straightening, a steam turbine vane material after forging 21 is subjected to cutting, as shown in FIG. 5, whereby a protective part joint surface is formed (Step S13). In the steam turbine vane material after forging 21, after the protective part joint surface 22 is formed, the protective part joint surface 22 is subjected to build-up welding, whereby a protective part build-up bead 23 is formed (Step S14).

After the protective part build-up bead 23 is formed, the steam turbine vane material after forging 21 is subjected to solution heat treatment and subjected to stabilization heat treatment (Step S15). After the heat treatment, the steam turbine vane material after forging 21 is subjected to straightening so as to be formed in a predetermined shape. After the straightening, the steam turbine vane material after forging 21 is subjected to cutting, thereby being formed into a steam turbine vane material after rough processing 24 (Step S16).

The steam turbine vane material after rough processing 24 is subjected to aging treatment (Step S17). After the aging treatment, the steam turbine vane material after rough processing 24 is subjected to straightening so as to be formed in a predetermined shape. After the straightening, the steam turbine vane material after rough processing 24 is subjected to cutting, thereby being formed into a steam turbine vane material after finishing processing 25 (Step S18). The steam turbine vane material after finishing processing 25 is subjected to polishing, thereby being formed into the steam turbine vane 1 (Step S19). The steam turbine vane 1 is manufactured in this manner, whereby a portion of the protective part build-up bead 23 is formed into the protective part 6.

In the steam turbine vane material after forging 21 with the protective part joint surface 22 formed therein, a portion of the surface formed by forging remains, and thus the steam turbine vane material after forging 21 is larger than the steam turbine vane material after rough processing 11 in the above-described embodiment. For this reason, the deformation amount of the steam turbine vane material after forging 21 which is deformed by build-up welding is smaller than the deformation amount of the steam turbine vane material after rough processing 11 which is deformed by build-up welding. In this steam turbine vane manufacturing method, as compared to the steam turbine vane manufacturing method in the above-described embodiment, it is possible to more appropriately manufacture the steam turbine vane 1.

Figure 6:
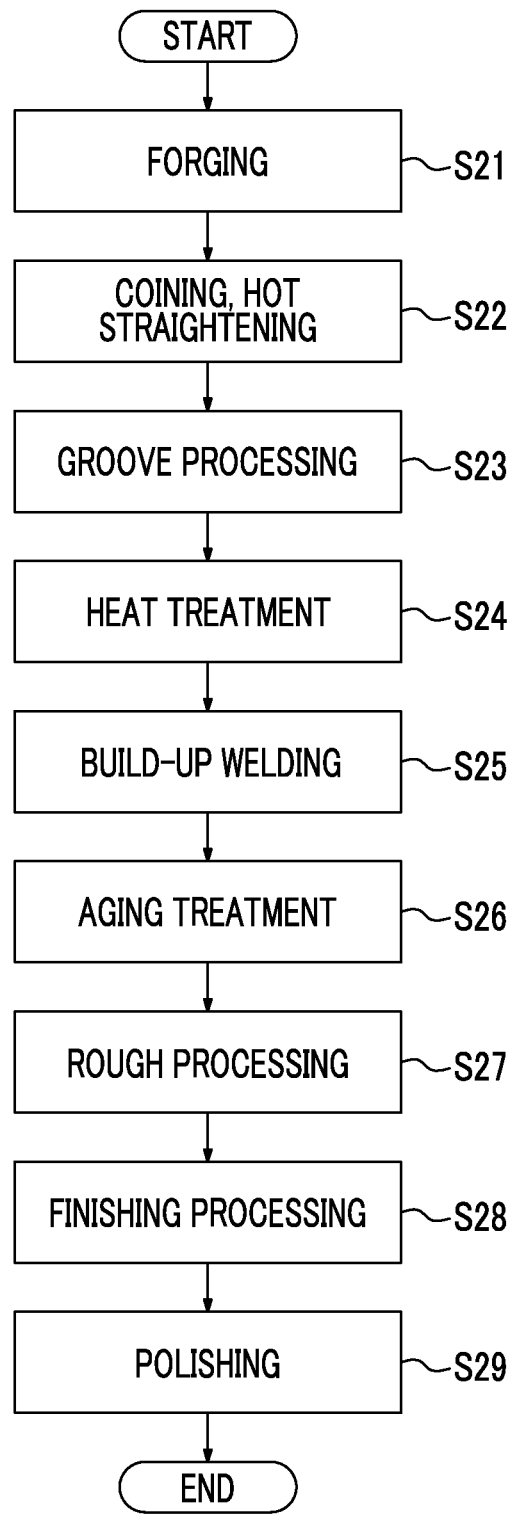
FIG. 6 is a flowchart showing still another embodiment of the steam turbine vane manufacturing method.

FIG. 6 shows still another embodiment of the steam turbine vane manufacturing method according to the present invention. In the steam turbine vane manufacturing method, first, in the same manner as in the steam turbine vane manufacturing method shown in FIG. 4, the steam turbine vane material after forging 21 is manufactured by forging a solid metal blank (Step S21) and then subjected to coining and hot straightening (Step S22), whereby the protective part joint surface 22 is formed (Step S23).

After the protective part joint surface 22 is formed, the steam turbine vane material after forging 21 is subjected to solution heat treatment and subjected to stabilization heat treatment (Step S24). After the heat treatment, in the steam turbine vane material after forging 21, the protective part joint surface 22 is subjected to build-up welding, whereby the protective part build-up bead 23 is formed (Step S25).

After the protective part build-up bead 23 is formed, the steam turbine vane material after forging 21 is subjected to aging treatment (Step S26). After the aging treatment, the steam turbine vane material after forging 21 is subjected to straightening so as to be formed in a predetermined shape. After the straightening, the steam turbine vane material after forging 21 is subjected to cutting, thereby being formed into the steam turbine vane material after rough processing 24 (Step S27).

The steam turbine vane material after rough processing 24 is subjected to straightening so as to be formed in a predetermined shape. After the straightening, the steam turbine vane material after rough processing 24 is subjected to cutting, thereby being formed into the steam turbine vane material after finishing processing 25 (Step S28). The steam turbine vane material after finishing processing 25 is subjected to polishing, thereby being formed into the steam turbine vane 1 (Step S29). The steam turbine vane 1 is manufactured in this manner, whereby a portion of the protective part build-up bead 23 is formed into the protective part 6.

Also in this steam turbine vane manufacturing method, it is possible to appropriately manufacture the steam turbine vane 1, in the same manner as in the above-described steam turbine vane manufacturing method shown in FIG. 4. In general, the higher the hardness of the steam turbine vane material after forging 21, the easier the straightening for forming the steam turbine vane material after forging 21 into a predetermined shape. According to this steam turbine vane manufacturing method, the steam turbine vane material after forging 21 is subjected to aging treatment and then subjected to straightening so as to be formed in a predetermined shape, whereby the hardness of the steam turbine vane material after forging 21 immediately before it is subjected to rough processing is higher, as compared to the above-described steam turbine vane manufacturing method shown in FIG. 4. For this reason, according to this steam turbine vane manufacturing method, it is possible to more easily manufacture the steam turbine vane 1, as compared to the steam turbine vane manufacturing method shown in FIG. 4.

In addition, the protective part 6 can be formed of a material which is different from Stellite (registered trademark). The material is a material having superior erosion resistance to a material for forming the main body portion 5, and for example, austenitic stainless steel is exemplified. Also in a steam turbine vane manufacturing method in which such a material is utilized, it is possible to more easily manufacture the steam turbine vane 1, in the same manner as in the steam turbine vane manufacturing methods in the above-described embodiments.

In addition, the laser beam which is utilized in the build-up welding can be replaced by another laser beam which is emitted from a laser oscillator which is different from the $CO_2$ laser. As the laser oscillator, a YAG laser, a laser diode (LD), or the like is exemplified. In addition, the build-up welding can also be carried out by welding which is different from laser welding. As the welding, TIG welding is exemplified. Also in a steam turbine vane manufacturing method to which such welding is applied, it is possible to appropriately manufacture the steam turbine vane 1, in the same manner as in the steam turbine vane manufacturing methods in the above-described embodiments.

REFERENCE SIGNS LIST

1: steam turbine vane
2: root section
3: aerofoil profile section
5: main body portion
6: protective part
11: steam turbine vane material after rough processing
12: steam turbine vane material after forging
14: protective part joint surface 15: protective part build-up bead
16: steam turbine vane material after finishing processing
21: steam turbine vane material after forging
22: protective part joint surface
23: protective part build-up bead
24: steam turbine vane material after rough processing
25: steam turbine vane material after finishing processing

The invention claimed is:

1. A steam turbine vane manufacturing method comprising:
   a forging step of manufacturing a first steam turbine vane material after forging by forging the first steam turbine vane material;
   a groove processing step of forming a protective part joint surface in the first steam turbine vane material after forging;
   a build-up welding step of forming a protective part build-up bead on the protective part joint surface by build-up welding;
   a rough processing step of cutting the first steam turbine vane material after forging which is formed with the protective part build-up bead, and forming the first steam vane material into a second steam turbine vane material after rough processing; and
   a finishing processing step of performing finishing processing such that a steam turbine vane which is smaller than the second steam turbine vane material is formed by cutting a majority of a surface of the second steam turbine vane material after rough processing including cutting a majority of a surface of the protective part build-up bead along with the second steam turbine vane material.

2. The steam turbine vane manufacturing method according to claim 1, further comprising: a polishing step of polishing the steam turbine vane after the finishing processing step.

3. The steam turbine vane manufacturing method according to claim 1, further comprising: an aging treatment step of performing aging treatment on the second steam turbine vane material along with the protective part build-up bead before the finishing processing step is carried out.

4. The steam turbine vane manufacturing method according to claim 1, further comprising: a coining step of coining the first steam turbine vane material after the forging step.

5. The steam turbine vane manufacturing method according to claim 1, further comprising: a coining and hot straightening step of coining and hot straightening the first steam turbine vane material after the forging step.

* * * * *